United States Patent
Zombo et al.

(10) Patent No.: US 8,184,151 B2
(45) Date of Patent: May 22, 2012

(54) FLEXIBLE IMAGING FIBER BUNDLE MONITORING SYSTEM FOR COMBUSTION TURBINES

(75) Inventors: Paul J. Zombo, Cocoa, FL (US); Vinay Jonnalagadda, Orlando, FL (US); Erwan Baleine, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 431 days.

(21) Appl. No.: 12/562,196

(22) Filed: Sep. 18, 2009

(65) Prior Publication Data

US 2011/0069165 A1    Mar. 24, 2011

(51) Int. Cl.
*H04N 7/18* (2006.01)

(52) U.S. Cl. .............. 348/82; 600/474; 424/9; 424/34

(58) Field of Classification Search .......... 348/82, 348/85; 424/9, 34; 600/474
See application file for complete search history.

(56) References Cited

U.S. PATENT DOCUMENTS

| | | |
|---|---|---|
| 3,674,452 A | 7/1972 | Strack |
| 4,591,794 A | 5/1986 | Shattuck et al. |
| 4,711,524 A | 12/1987 | Morey et al. |
| 4,770,443 A | 9/1988 | Yamamoto |
| 4,988,171 A | 1/1991 | Yokota |
| 5,170,775 A | 12/1992 | Tagami |
| 5,222,477 A | 6/1993 | Lia |
| 5,557,099 A | 9/1996 | Zielinski et al. |
| 6,006,002 A | 12/1999 | Motoki et al. |
| 6,037,581 A | 3/2000 | Zorner |
| 6,453,090 B1 | 9/2002 | Conde et al. |
| 6,615,071 B1 * | 9/2003 | Casscells et al. .............. 600/474 |
| 6,639,664 B2 | 10/2003 | Haan et al. |
| 6,640,121 B1 * | 10/2003 | Telischi et al. ................ 600/379 |
| 6,678,060 B2 | 1/2004 | Heyworth |
| 6,763,261 B2 * | 7/2004 | Casscell et al. ................ 600/474 |
| 7,121,098 B2 | 10/2006 | Hatcher |
| 7,231,817 B2 | 6/2007 | Smed et al. |
| 2003/0028114 A1 * | 2/2003 | Casscells et al. .............. 600/474 |
| 2003/0171691 A1 * | 9/2003 | Casscells et al. .............. 600/549 |

FOREIGN PATENT DOCUMENTS

JP    2002253485    10/2002

* cited by examiner

*Primary Examiner* — Khanh Dinh

(57) ABSTRACT

An imaging system for on-line imaging of a component in a gas turbine engine. The imaging system includes a flexible imaging bundle formed by a plurality of optical elements. An imaging end of the optical elements images a component in a hot gas path of the engine during operation of the engine and a viewing end provides an image of the component at a location displaced from the hot gas path. The optical elements are surrounded by a flexible metal sheath that is permeable to air to provide cooling air the optical elements from an air source surrounding the flexible imaging bundle.

20 Claims, 3 Drawing Sheets

FLEXIBLE IMAGING FIBER BUNDLE MONITORING SYSTEM FOR COMBUSTION TURBINES

FIELD OF THE INVENTION

The present invention relates to a device for monitoring a turbine engine component and, more particularly, to a device for imaging a location on a turbine blade in a hot gas path during operation of a gas turbine engine.

BACKGROUND OF THE INVENTION

Inaccessible or confined areas such as, for example, the interior parts of gas turbine engines, often require routine inspection to verify the integrity of internal engine parts and maintain safe operation of the engine by identifying potential problems, i.e., defects in a part, prior to failure of the part, or to identify the source of an existing problem. For example, problems may be identified through visual inspection by use of a borescope, such as during routine downtime maintenance of the gas turbine engine.

Additional monitoring of the turbine engine may be performed during operation of the engine to further identify the condition of components located within the hot gas path of the engine. While a variety of structures and materials may be incorporated into a borescope used for inspection of the interior turbine components during downtime of the turbine engine when the components are relatively cool, visual monitoring of the turbine components during operation of the turbine provides additional restrictions on the monitoring equipment. In a known high temperature monitoring system, a viewing tube may be used to support optical components, i.e., a series of lenses, for conveying images obtained from a location in the hot gas path to a location at the exterior of the engine, and to isolate the optical components from the heat of the hot gases. In addition, a cooling air flow may be required, such as may be provided through a conduit from a cooling air source outside of the turbine engine for introducing a pressurized flow of a cooling fluid into the monitoring system.

Further, the available monitoring locations available for prior monitoring systems, such as those used for continuously monitoring turbine engine components during operation of the engine, have generally included those which provide a predetermined access path, such as a generally straight through access path, from an outer casing wall to an interior portion of the turbine engine. Accordingly, monitoring of components in turbine engines by continuous monitoring systems has generally been restricted to those locations that present substantially unobstructed access between the outer casing wall and the interior portion of the engine.

SUMMARY OF THE INVENTION

In accordance with one aspect of the invention, an imaging system is provided for imaging of a component in a gas turbine engine. The imaging system includes a flexible imaging bundle comprising an imaging end for imaging a component in a hot gas path of the engine, and a viewing end providing an image of the component at a location displaced from the hot gas path. The imaging end comprises a plurality of receptor sites defining an imaging plane for receiving an image of the component. The flexible imaging bundle defines a plurality of separate light paths defined by a plurality of high temperature optical elements, each light path corresponding to a receptor site. The viewing end comprises a plurality of emission sites, each emission site corresponding to a receptor site wherein a location and number of the emission sites forming the viewing end have a one-to-one correspondence to the location and number of the imaging sites forming the imaging end to effect transmission of a coherent image through the flexible imaging bundle from the imaging end to the viewing end.

The receptor sites at the imaging end may be positioned in side-by-side relation to each other in a predetermined imaging array, and the emission sites at the viewing end may be positioned in side-by-side relation to each other in a predetermined viewing array.

A location and number of the emission sites forming the viewing array preferably have a one-to-one correspondence to the location and number of the imaging sites forming the imaging array.

The imaging array preferably comprises a plurality of rows and columns of the receptor sites arranged in a rectangular array at the imaging end, and the viewing array comprises a plurality of rows and columns of the emission sites arranged in a rectangular array at the viewing end.

The high temperature optical elements comprise optical fibers that are temperature resistance to temperatures of at least about 350° C.

The optical elements may comprise a plurality of optical fibers and the flexible imaging bundle may comprise at least about 1000 optical fibers to provide a coherent image at the viewing end.

A flexible metal sheath may be provided surrounding the optical elements, the flexible metal sheath is permeable to air for passage of air through the flexible metal sheath into cooling contact with the optical elements.

The imaging system may include a housing enclosing the imaging end and at least one optical element located for imaging light from the component to the imaging end, and a cooling passage may be defined through the housing for providing passage of cooling air.

The imaging system may include a camera for receiving and recording two-dimensional near infrared images transmitted through the imaging bundle emitted from the emission sites, and at least one lens for imaging light emitted from the emission sites to the camera.

In accordance with another aspect of the invention, a device for imaging a location on turbine blades is provided in a gas turbine engine including an outer casing wall and a blade ring structure located radially inwardly from the outer casing wall, and elongated turbine blades supported for rotation about an axis of rotation within a hot gas path defined within the blade ring structure. The device includes a flexible fiber optic imaging bundle comprising an imaging end mounted to the turbine engine adjacent to the blade ring structure for imaging a predetermined location on the blades during a rotational movement of the blades within the hot gas path past the imaging end, and a viewing end mounted to the turbine engine adjacent to the outer casing wall and providing a coherent image of the blades at a location displaced from the hot gas path. The imaging end comprises a plurality of receptor sites defining an imaging plane for receiving images of the blades during the movement of the blades past the imaging end. The flexible fiber optic imaging bundle comprises a plurality of high temperature optical elements, each optical element defining a separate light path corresponding to a receptor site. A flexible metal sheath surrounds the optical elements and extends through a shell area between the blade ring structure and the outer casing wall. The viewing end comprises a plurality of emission sites, each emission site is defined at an end of an optical element of the imaging bundle and corresponds to a receptor site to effect emission of a coherent two-dimensional image corresponding to the image received at the imaging end.

The imaging end may be directed to receive images from the predetermined location on the blades comprising a location between an end of the blades and the axis of rotation.

The flexible metal sheath may comprise a flexible braided metal sheath that is permeable to air for providing passage of cooling air to the optical elements within the flexible imaging bundle. The cooling air comprises air passing through the shell area between the blade ring structure and the outer casing wall and comprising air at a higher pressure than a pressure in the hot gas path.

The imaging end may receive images comprising near infrared images conveyed through the optical elements as high speed images for providing a near infrared image at the emission end, the near infrared image providing a temperature mapping comprising an image of intensity variations obtained from the predetermined location on the blades during operation of the gas turbine engine.

The high temperature optical elements may comprise optical fibers that are temperature resistant to temperatures of at least about 350° C. to convey images during operation of the gas turbine engine.

The imaging bundle may form a flexible indirect line-of-sight optical path between the blade ring structure and the outer casing wall.

The imaging end is located and oriented adjacent to the blade ring structure independently of a location and orientation of the viewing end adjacent to the outer casing wall.

A housing may be provided for enclosing the imaging end, and an air passage may be defined through the housing for receiving cooling air comprising air passing through the shell area between the blade ring structure and the outer casing wall and comprising air at a higher pressure than a pressure in the hot gas path.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
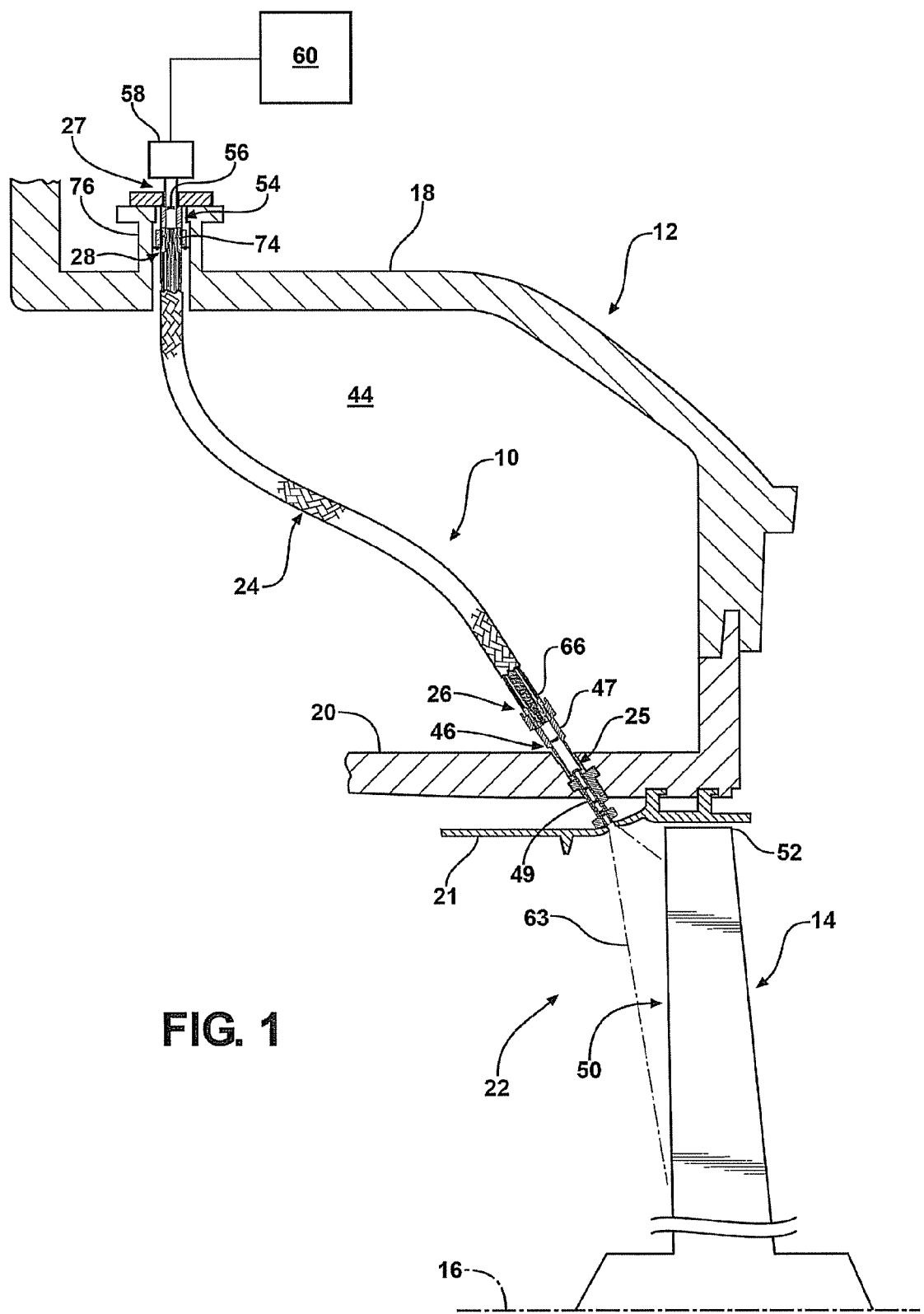
FIG. 1 is a cross-sectional view through a portion of a turbine engine and depicting an imaging system including a flexible imaging bundle located for receiving images from a component of the engine.

Referring initially to FIG. 1, an imaging system 10 is illustrated for providing imaging of a component in a gas turbine engine 12 during operation of the turbine engine 12. In particular, the imaging system 10 is shown mounted to the turbine engine 12 and positioned extending between an outer casing wall 18 and a blade ring structure 20 supported radially inwardly from the outer casing wall 18 in a turbine section of the turbine engine 12. In the illustrated embodiment, the imaging system 10 is provided for imaging a location on a component comprising an elongated turbine blade 14. The blade 14 extends in a hot gas path 22 defined within the blade ring structure 20 of the engine 12, and the blade 14 is supported for rotation about a rotational axis 16 for a rotor (not shown) of the engine 12.

The imaging system 10 comprises a flexible imaging bundle 24 including an imaging end 26 located at an inner end 25 of the imaging system 10 for imaging a component, i.e., the blade 14, in the hot gas path 22 of the engine 12. The imaging bundle 24 further includes a viewing end 28 located at an outer end 27 of the imaging system 10 for providing an image of the blade 14 at a location displaced from the hot gas path 22, i.e., at a location outside of the outer casing 18.

Figure 2:
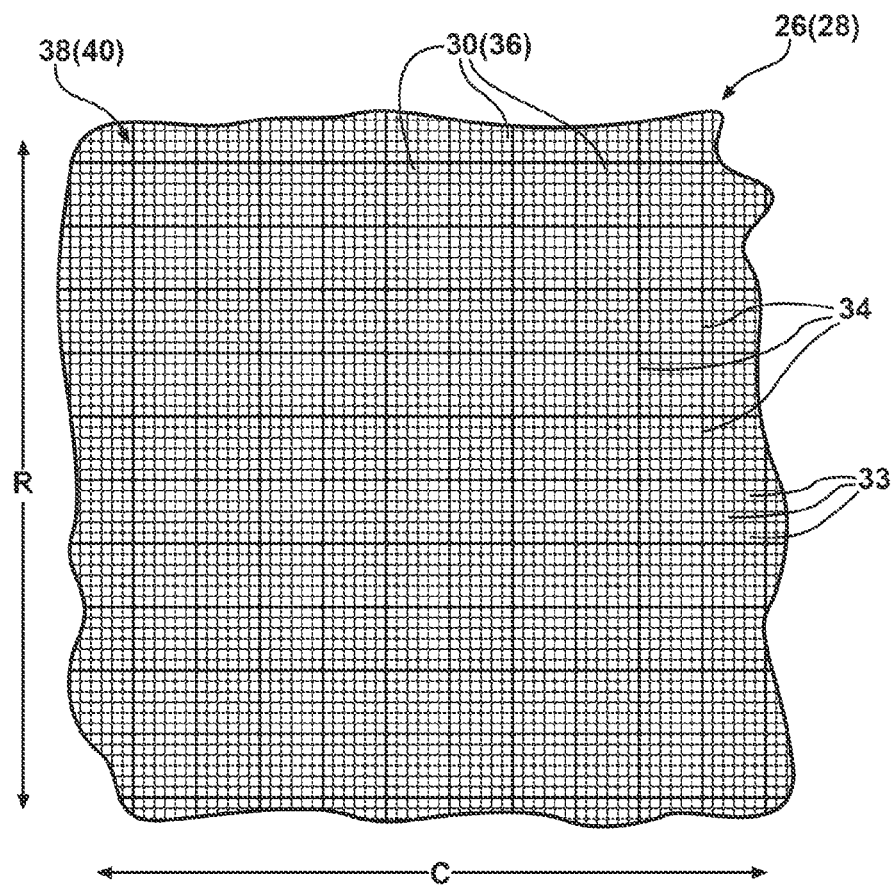
FIG. 2 depicts an enlarged end view of a portion of an array located at an end of the flexible imaging bundle.

As seen in FIG. 2, showing an enlarged end view of a portion of the imaging end 26 of the flexible imaging bundle 24, the imaging end 26 comprises a plurality of receptor sites 30 defining an imaging plane 32 (see FIG. 3) for receiving an image of the blade 14. The flexible imaging bundle 24 defines a plurality of separate light paths and, in the present embodiment, the separate light paths are defined by a plurality of optical fiber bundle elements 34 (hereinafter optical elements 34), see also FIG. 3. The end of each light path is defined by an end of an optical element 34 corresponding to a receptor site 30, and the plurality of optical elements 34 form a fiber bundle 35 within the flexible imaging bundle 24.

The viewing end 28 of the flexible imaging bundle 24 is formed with a substantially identical construction as the imaging end 26, and is illustrated in FIG. 2 by reference numbers in parenthesis. That is, the viewing end 28 comprises a plurality of emission sites 36, each emission site 36 corresponding to a respective receptor site 30 to effect emission of an image corresponding to the image received at the imaging end 26.

As seen in FIG. 2, the receptor sites 30 at the imaging end 26 are positioned in side-by-side relation to each other in a predetermined imaging array 38. Similarly, the emission sites 36 at the viewing end 28 are positioned in side-by-side relation to each other in a predetermined viewing array 40. The location and number of the emission sites 36 forming the viewing array 40 preferably have a one-to-one correspondence to the location and number of the receptor sites 30 forming the imaging array 38. The imaging array 38 preferably comprises a plurality of rows (spaced along reference line R), and columns (spaced along reference line C) of the receptor sites 30 arranged in a rectangular array at the imaging end 26. The viewing array 40 is formed with a corresponding configuration and comprises a plurality of rows and columns of the emission sites 36 arranged in a rectangular array at the viewing end 28.

In an embodiment of the invention, as seen in FIG. 2, each optical element 34 comprises a high temperature multi-fiber bundle of thirty-six 10 μm optical fibers 33 arranged in a 6×6 rectangular array. The optical fibers 33 are preferably temperature resistant up to temperatures of at least about 350° C. or greater, such as may be obtained from SCHOTT North America, Inc., of Elmsford, N.Y. Further, the optical fibers 33 are preferably transmissive to light at wavelengths within a range from visible light to near infrared light, i.e., up to approximately 1.7 μm.

The one-to-one correspondence between the receptor sites 30 and the emission sites 36 provides a configuration of the flexible imaging bundle 24 for transmitting a coherent image from the imaging array 38 to the viewing array 40. The transmission of a coherent image at a near infrared wavelength enables formation of a high resolution near infrared image at the viewing end 28 of the flexible imaging bundle 24 for temperature mapping of an imaged location on the blade 14. That is, variations of visible or near infrared light intensity within the imaged location may be obtained to form a temperature map for analysis of thermal and/or structural variations in the blade 14, as indicated by the intensity variations in the image.

It is believed that at least about 1000 optical fibers 33 are required to provide transmission of a coherent image. Hence, in an embodiment of the invention, at least about 30 optical elements 34 may be provided to define each of the receptor and emission sites 30, 36, where the 30 optical elements 34 corresponds to 30×36=1080 optical fibers 33 at the imaging and viewing ends 26, 28 for providing a coherent image. It should be noted that substantially more than 1000 optical fibers 33 may be provided to increase the resolution of the image provided to the viewing end 28. In a preferred embodiment, the imaging bundle 24 may include 360,000 optical fibers 33, corresponding to 10,000 optical elements 34. In addition, each of the optical elements 34 may be formed with a greater or fewer number of optical fibers 33 than described herein. Alternatively, the optical elements 34 may comprise individual fibers 33 arranged in arrays at each of the imaging and viewing ends 26, 28, rather than comprising the grouping of plural optical fibers 33, e.g., six optical fibers 33, as described above for each of the optical elements 34.

Figure 3:
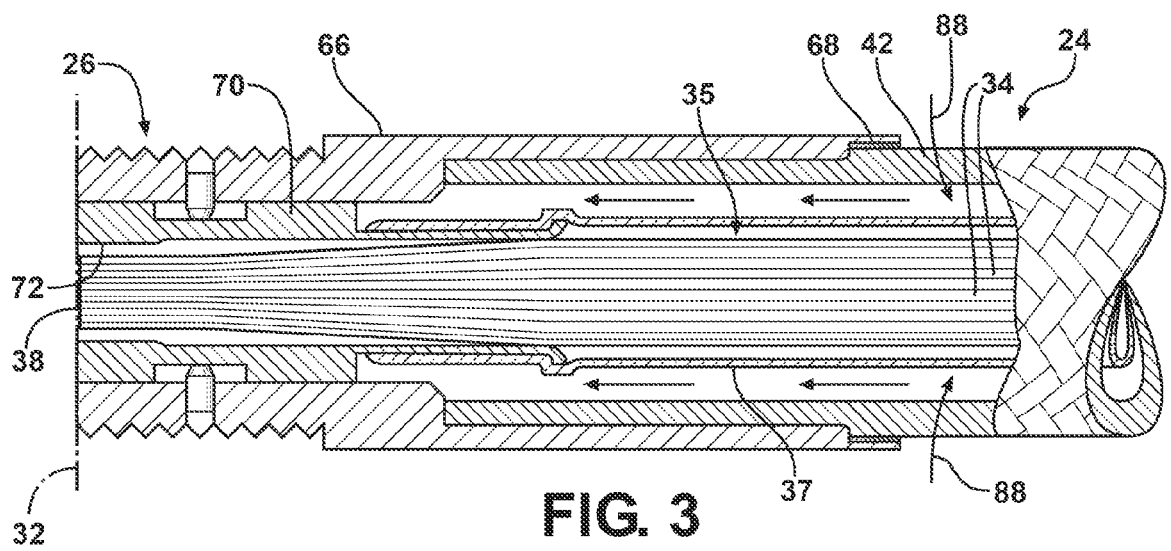
FIG. 3 is a partial cut-away view of an end of the flexible imaging bundle.

Referring to FIG. 3, the flexible imaging bundle 24 further comprises a flexible metal sheath 42 surrounding the fiber bundle 35. The flexible metal sheath 42 is formed of a metal resistant to high temperatures of at least about 350° C. or greater.

In an embodiment of the invention, the flexible metal sheath 42 may comprise a flexible braided stainless steel metal sheathing. The flexible metal sheath 42 provides protection to the optical elements 34 to shield the optical elements 34 against heat, and to protect the optical elements 34 against damage from contact with components (not shown) located in a shell area 44 (FIG. 1) through which the flexible imaging bundle 24 passes in extending between the blade ring structure 20 and the outer casing wall 18. By way of example, the length of the optical elements for extending through the shell area 44 may be approximately 1.2 meters. In addition, an intermediate sleeve 37 may be provided around the outside of the fiber bundle 35 to protect the optical elements 34 from contact with the interior of the flexible metal sheath 42. For example, the intermediate sleeve 37 may comprise a fiberglass sleeve to provide protection against damage, such as abrasion damage, to the fiber bundle 35.

As seen in FIG. 3, the flexible imaging bundle 24 includes an end tip housing 66 fastened to the end of the flexible metal sheath 42 to define a rigid tip section for the imaging end 26 of the flexible imaging bundle 24. The end tip housing 66 may be attached to flexible metal sheath 42 by a high temperature braze 68, or by other known attachment mechanisms. The imaging array end of the fiber bundle 35 is supported in the end tip housing 66 by a bushing 70 that may be formed with an interior opening 72 configured to match the exterior shape of the imaging array 38. For example, the interior opening 72 may have a rectangular shape matching the rectangular shape of the imaging array 38.

Figure 4:
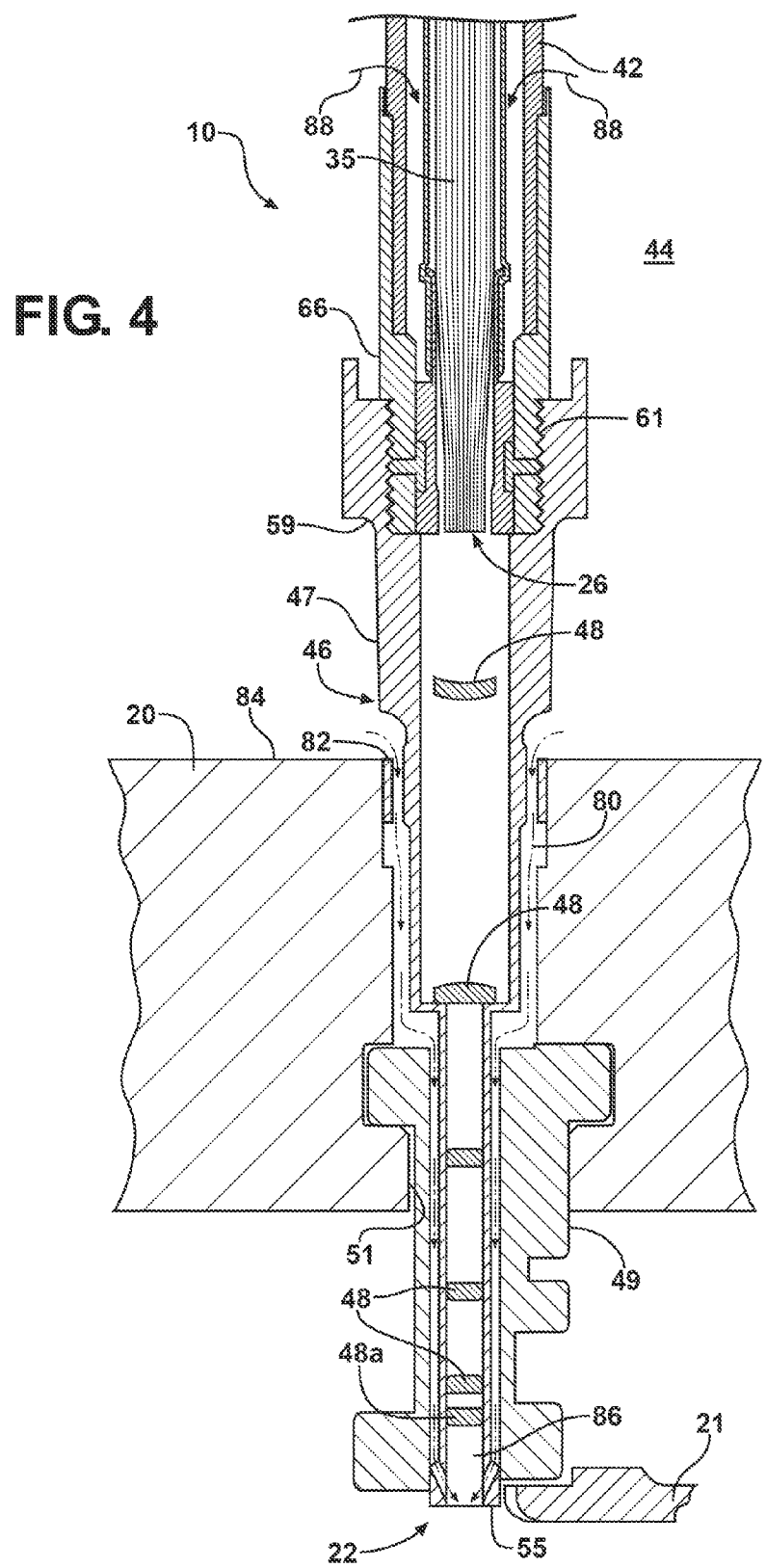
FIG. 4 is an enlarged view of an imaging end of the flexible imaging bundle supported at a blade ring structure.

Referring to FIG. 4, the imaging system 10 includes an imaging housing 46 comprising an objective lens section 47 and a mounting section 49. The mounting section 49 is mounted through an aperture 51 in the blade ring structure 20, and may extend to a vane shroud portion 21 (FIG. 1) located radially inwardly of the blade ring structure 20. The objective lens section 47 extends into and is supported by the mounting section 49. The objective lens section 47 includes a proximal end 59 engaging and rigidly connected to the end tip housing 66 to enclose the imaging end 26. The connection between the end tip housing 66 and the proximal end 59 may comprise a threaded connection 61.

The objective lens section 47 includes a distal end 55 located at or adjacent to the hot gas path, and further comprises optical components including a plurality of lenses 48 located along the objective lens section 47 from a location adjacent to the distal end 55 to a location adjacent to the proximal end 59. The objective lens section 47 images light from a predetermined location 50 (FIG. 1) along the blade 14 to the imaging plane 32 (FIG. 3) at the imaging end 26 of the flexible imaging bundle 24. In particular, the lenses 48 of the objective lens section 47 are configured to focus the predetermined location 50 to the imaging plane 32 of the receptor sites 30.

The predetermined location 50 may be located at a position along the length of the blade 14 between a radially outer tip 52 (FIG. 1) of the blade 14 and the rotational axis 16. The predetermined location comprises an area within a field of view 63 (FIG. 1) formed by the lenses 48 of the objective lens section 47, and defined by the angle θ. The angle θ of the field of view may be approximately 50°.

Referring to FIG. 1, the viewing end 28 of the flexible imaging bundle 24 may be formed with substantially the same construction as described for the viewing end 26. The outer end 27 of the imaging system 10 extends to an access port 76 on the outer casing wall 18 and includes a viewing housing 54 rigidly mounted to the access port 76 and configured to receive an end tip housing 74 at the viewing end 28 of the flexible imaging bundle 24. The viewing housing 54 may also enclose at least one optical element comprising a lens 56 located for imaging light emitted from the emission sites 36 at the viewing end 28 to a camera 58.

As seen in FIG. 1, the imaging system 10 may further include a processor 60 for controlling acquisition and recording of images received by the camera 58. The camera 58 may comprise a near infrared focal plane camera having an array for receiving and processing images transmitted at wavelengths on the order of approximately 1.5 μm, i.e., in the near infrared spectral range, as well as for processing images in the range of visible light.

Referring to FIG. 4, the lenses 48 of the objective lens section 47 are cooled with shell air provided to the shell area 44, e.g., air provided to the shell area 44 for cooling of turbine components, such as vane and associated shroud structure. In particular, a gap 80 may be provided between the objective lens section 47 and the aperture 51, as well as between the objective lens section 47 and an interior diameter of the mounting section 49, to define an air passage through the imaging housing 46. The gap 80 may be defined by an annular area surrounding the objective lens section 47. Air provided to the shell area 44 may flow into the gap 80 at a location 82 where the objective lens section 47 intersects a shell side surface 84 of the blade ring structure 20. Air passing through the gap 80 flows to the distal end 55 where it may pass into a chamber 86 to provide a purging and cooling flow of air adjacent to a distal lens 48a.

Referring additionally to FIG. 3, the invention further provides a cooling air flow to cool the optical elements 34, thus facilitating long term use of the imaging system 10 during turbine operation. In particular, cooling air comprising shell air flows through the wall of the flexible metal sheath 42 into cooling contact with the fiber bundle 35. That is, the flexible metal sheath 42 is permeable to air, wherein air may flow through small gaps formed between the braid elements in the wall of the flexible braided stainless steel metal sheathing defining the flexible metal sheath 42, as is illustrated by the flow lines 88 in FIGS. 3 and 4. Further, the air may pass through the intermediate sleeve 37 to cool the optical elements 34. The air flow 88 passing through the flexible metal sheath 42 may additionally flow out of the flexible imaging bundle 24 at the imaging end 26, passing out though one or more gaps between the bushing 70 and the end tip housing 66, or though a gap or gaps between the bushing 70 and the imaging array 38 at the ends of the optical elements 34, to allow the cooling air to pass into the objective lens section 47 for cooling of the lenses 48. The cooling air received at the objective lens section 47 from the flexible imaging bundle 24 joins the air flow passing though the gap 80 and out through the distal end 55.

It should be noted that the air in the shell area 44 is typically at a pressure of approximately 250 psi, and therefore provides a source of pressurized air to cause the air to pass through the flexible metal sheath 42 and along the objective lens section 47 for cooling of the fiber bundle 35 and lenses 48. In particular, the air within the shell area 44 is at a substantially higher pressure than the pressure of the hot gas path 22, such that the cooling air will flow in the direction of the hot gas path 22. Such a cooling arrangement effects a continuous cooling to the fibers 34, substantially preventing thermal degradation and/or damage to the fibers 34 during continuous on-line imaging provided by the flexible imaging bundle 24.

The present imaging system 10 is adapted to provide two-dimensional images of the predetermined location 50 of the blade 14 during operation of the turbine engine, i.e., during rotational movement of the blade or blades 14 passing the imaging end 26 of the imaging system 10. The imaging system 10 provides images, including features located in the area of the predetermined location 50, as defined within the field of view 63, having height and length dimensions that may correspond to the directions defined by the reference lines R and C, respectively. Hence, the predetermined location 50 comprises a viewing region or area on the blade 14, as is generally illustrated by the viewing location 50 in FIG. 1.

The imaging system 10 is particularly configured to transmit visible and near infrared images through the flexible imaging bundle 24. The features imaged by the system 10 may comprise indicators of defects or stress including, for example, variations in visible or near infrared light intensity, i.e., providing temperature mapping, within the predetermined location 50. For example, the features may be indicated via an image in the near infrared spectrum formed at the imaging plane 32 and transmitted through the flexible imaging bundle 24 to the emission sites 36, where a two-dimensional image, corresponding to the image at the imaging plane 32, is formed and transmitted to the camera 58. Temperature mapping of the predetermined location 50 is performed on-line and may be used to identify, for example, a condition on a component indicative of a potential failure of the component during operation of the engine 12.

The imaging system 10 is configured to provide high speed processing of images obtained from multiple blade passes. In particular, the imaging system 10 obtains an image for each blade pass of blades 14 located around a rotor (not shown) of the turbine engine 12. The imaging system 10 operates in a continuous on-line mode wherein visible and infrared images may be continuously obtained for each blade pass, and with each rotor revolution, during operation of the turbine engine 12.

The flexible imaging bundle 24 disclosed herein is configured to avoid access restrictions previously encountered in prior systems providing for viewing interior engine components. The flexible imaging bundle 24 enables placement of the imaging end 26 for viewing particular selected predetermined locations 50 without substantial limitations imposed by the location of the viewing end 28. For example, as is illustrated in FIG. 1, the flexible imaging bundle 24 may define a nonlinear (indirect) line-of-sight between the imaging end 26 and the viewing end 28, and may be substantially bent or curved, i.e., curved with one or more radii of curvature to provide a freely configured path between the opposing ends of the flexible imaging bundle 24. That is, the imaging end 26 may be the located and orientated adjacent to the blade ring structure 20 independently of a location and orientation of the viewing end 28 adjacent to the outer casing wall 18. Hence, the shape and position of the flexible imaging bundle 24 within the shell area 44 may be readily altered to extend around and/or through components (not shown) located in the shell area 44. Further the implementation of the flexible imaging bundle 24 with cooling from the shell air to the optical bundle 35 facilitates the use of the flexible imaging bundle 24 in high temperature on-line applications, i.e., directly adjacent to the hot gas path 22, without substantial degradation of the high temperature optical elements 34 and/or the lenses 48.

From the present description, it should be apparent that the present invention provides a flexible conduit for conveying images through a turbine engine, in which the opposing ends of a flexible imaging bundle may be independently positioned at preferred locations on the turbine. Further, the present invention provides such a flexible imaging bundle as a durable flexible structure that is configured to convey coherent near infrared images in a high temperature environment, i.e., at temperatures of at least 350° C., such that the coherent images may be obtained from internal components of the turbine during turbine operation.

It should be understood that, although the present invention has been described with particular reference to viewing a component comprising a blade 14, the present invention may be used to view other components located in the turbine engine 12. For example, the imaging system 10 may also be implemented to view a stationary component, such as a stationary vane (not shown) located in the hot gas path 22.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An imaging system for providing imaging of a component in a gas turbine engine, the imaging system comprising
    a flexible imaging bundle comprising an imaging end for imaging a component in a hot gas path of the engine, and a viewing end providing an image of the component at a location displaced from the hot gas path;

the imaging end comprising a plurality of receptor sites defining an imaging plane for receiving an image of the component;

the flexible imaging bundle defining a plurality of separate light paths defined by a plurality of high temperature optical elements, each light path corresponding to a receptor site; and the viewing end comprising a plurality of emission sites, each emission site corresponding to a receptor site wherein a location and number of the emission sites forming the viewing end have a one-to-one correspondence to the location and number of the imaging sites forming the imaging end to effect transmission of a coherent image through the flexible imaging bundle from the imaging end to the viewing end.

2. The imaging system according to claim 1, wherein the receptor sites at the imaging end are positioned in side-by-side relation to each other in a predetermined imaging array.

3. The imaging system according to claim 2, wherein the emission sites at the viewing end are positioned in side-by-side relation to each other in a predetermined viewing array.

4. The imaging system according to claim 3, wherein the imaging array comprises a plurality of rows and columns of the receptor sites arranged in a rectangular array at the imaging end, and the viewing array comprises a plurality of rows and columns of the emission sites arranged in a rectangular array at the viewing end.

5. The imaging system according to claim 1, wherein the high temperature optical elements comprise optical fibers that are temperature resistant to temperatures of at least about 350° C.

6. The imaging system according to claim 1, wherein the optical elements comprise a plurality of optical fibers and the flexible imaging bundle comprises at least about 1000 optical fibers to provide a coherent image at the viewing end.

7. The imaging system according to claim 6, including a flexible metal sheath surrounding the optical elements, the flexible metal sheath being permeable to air for passage of air through the flexible metal sheath into cooling contact with the optical elements.

8. The imaging system according to claim 1, including a housing enclosing the imaging end and at least one optical element located for imaging light from the component to the imaging end, and a cooling passage defined through the housing for providing passage of cooling air.

9. The imaging system according to claim 1, including a camera for receiving and recording two-dimensional near infrared images transmitted through the imaging bundle emitted from the emission sites, and at least one lens for imaging light emitted from the emission sites to the camera.

10. In a gas turbine engine including an outer casing wall and a blade ring structure located radially inwardly from the outer casing wall, and elongated turbine blades supported for rotation about an axis of rotation within a hot gas path defined within the blade ring structure, a device for imaging a location on the turbine blades, the device comprising:

a flexible fiber optic imaging bundle comprising an imaging end mounted to the turbine engine adjacent to the blade ring structure for imaging a predetermined location on the blades during a rotational movement of the blades within the hot gas path past the imaging end, and a viewing end mounted to the turbine engine adjacent to the outer casing wall and providing a coherent image of the blades at a location displaced from the hot gas path;

the imaging end comprising a plurality of receptor sites defining an imaging plane for receiving images of the blades during the movement of the blades past the imaging end;

the flexible fiber optic imaging bundle comprising a plurality of high temperature optical elements, each optical element defining a separate light path corresponding to a receptor site;

a flexible metal sheath surrounding the optical elements and extending through a shell area between the blade ring structure and the outer casing wall; and the viewing end comprising a plurality of emission sites, each emission site defined at an end of an optical element of the imaging bundle and corresponding to a receptor site to effect emission of a coherent two-dimensional image corresponding to the image received at the imaging end.

11. The device according to claim 10, wherein the imaging end is directed to receive images from the predetermined location on the blades comprising a location between an end of the blades and the axis of rotation.

12. The device according to claim 10, wherein the flexible metal sheath comprises a flexible braided metal sheath and is permeable to air for providing passage of cooling air to the optical elements within the flexible fiber optic imaging bundle.

13. The device according to claim 12, wherein the cooling air comprises air passing through the shell area between the blade ring structure and the outer casing wall and comprising air at a higher pressure than a pressure in the hot gas path.

14. The device according to claim 10, wherein opposing ends of the optical elements define the receptor and emission sites, and the receptor sites and emission sites are positioned in side-by-side relation at the imaging end and viewing end, respectively, and images of the predetermined location on the blades, formed at the receptor sites, are substantially duplicated at the emission sites.

15. The device according to claim 14, wherein the imaging end receives images comprising near infrared images conveyed through the optical elements for providing a near infrared image at the emission end, the near infrared image providing a temperature mapping comprising an image of intensity variations obtained from the predetermined location on the blades during operation of the gas turbine engine.

16. The imaging system according to claim 15, wherein the high temperature optical elements comprise optical fibers that are temperature resistant to temperatures of at least about 350° C. to convey images during operation of the gas turbine engine.

17. The device according to claim 10, wherein the flexible fiber optic imaging bundle forms a flexible indirect line-of-sight optical path between the blade ring structure and the outer casing wall.

18. The device according to claim 17, wherein the imaging end is located and oriented adjacent to the blade ring structure independently of a location and orientation of the viewing end adjacent to the outer casing wall.

19. The device according to claim 10, including a housing enclosing the imaging end and at least one optical element located in the housing for imaging light from the blades to the imaging end.

20. The device according to claim 18, including an air passage defined through the housing for receiving cooling air comprising air passing through the shell area between the blade ring structure and the outer casing wall and comprising air at a higher pressure than a pressure in the hot gas path.

* * * * *